US011338851B2

(12) United States Patent
Zhang et al.

(10) Patent No.: US 11,338,851 B2
(45) Date of Patent: May 24, 2022

(54) HITCH ASSIST SYSTEM FEATURING TRAILER LOCATION IDENTIFICATION

(71) Applicant: Ford Global Technologies, LLC, Dearborn, MI (US)

(72) Inventors: Yi Zhang, San Jose, CA (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 535 days.

(21) Appl. No.: 15/697,870

(22) Filed: Sep. 7, 2017

(65) Prior Publication Data

US 2019/0071123 A1   Mar. 7, 2019

(51) Int. Cl.

| G06T 7/00 | (2017.01) |
| B60D 1/00 | (2006.01) |
| B62D 13/06 | (2006.01) |
| B60D 1/62 | (2006.01) |
| B62D 15/02 | (2006.01) |
| B60D 1/36 | (2006.01) |
| B60W 50/14 | (2020.01) |
| B60Q 9/00 | (2006.01) |
| B60D 1/24 | (2006.01) |
| B60R 1/00 | (2022.01) |

(52) U.S. Cl.
CPC ............ *B62D 13/06* (2013.01); *B60D 1/245* (2013.01); *B60D 1/36* (2013.01); *B60D 1/62* (2013.01); *B60Q 9/00* (2013.01); *B60Q 9/005* (2013.01); *B60R 1/003* (2013.01); *B60W 50/14* (2013.01); *B62D 15/027* (2013.01); *G06T 2207/30252* (2013.01)

(58) Field of Classification Search
CPC ........ B62D 13/06; B60D 1/245; B60Q 9/005; B60R 1/003; G06T 2207/30252
See application file for complete search history.

(56) References Cited

U.S. PATENT DOCUMENTS

| 5,526,294 | A | 6/1996 | Ono et al. |
| 5,880,538 | A | 3/1999 | Schulz |
| 8,971,715 | B2 | 3/2015 | Zhang et al. |
| 9,219,472 | B2 | 12/2015 | Buttolo et al. |
| 9,287,864 | B2 | 3/2016 | Buttolo et al. |
| 9,403,413 | B2 * | 8/2016 | Talty .................. B60D 1/36 |
| 9,766,628 | B1 * | 9/2017 | Lo .................... G05D 1/0246 |
| 2006/0082545 | A1 | 4/2006 | Choquet et al. |
| 2009/0271078 | A1 | 10/2009 | Dickinson |
| 2010/0027879 | A1 * | 2/2010 | Sato .................. G06T 5/007 382/162 |
| 2012/0055557 | A1 | 3/2012 | Belz et al. |

(Continued)

FOREIGN PATENT DOCUMENTS

| DE | 102004043761 A1 | 3/2006 |
| WO | 2016069498 A1 | 5/2016 |

*Primary Examiner* — Zhihan Zhou
(74) *Attorney, Agent, or Firm* — Raymond Coppiellie; Price Heneveld LLP

(57) ABSTRACT

A hitch assist system is provided herein. The system includes an imager for capturing images of a rear-vehicle scene containing a trailer and a controller for processing the captured images. A device is disposed at a trailer location and has a display configured to flash a shape at a predetermined frequency and alternating in color. The controller identifies the shape in the captured images to determine the trailer location.

20 Claims, 5 Drawing Sheets

(56) References Cited

U.S. PATENT DOCUMENTS

| | | | |
|---|---|---|---|
| 2012/0069199 A1* | 3/2012 | Chang | G06F 3/005 |
| | | | 348/207.1 |
| 2012/0208592 A1* | 8/2012 | Davis | H04N 5/235 |
| | | | 455/556.1 |
| 2013/0024169 A1 | 1/2013 | Veerasamy | |
| 2014/0012465 A1* | 1/2014 | Shank | B60D 1/58 |
| | | | 701/36 |
| 2015/0115571 A1* | 4/2015 | Zhang | B60D 1/06 |
| | | | 280/477 |
| 2015/0253428 A1* | 9/2015 | Holz | G01S 17/42 |
| | | | 356/5.01 |
| 2016/0217662 A1* | 7/2016 | Kashar | G04G 21/04 |
| 2017/0043807 A1* | 2/2017 | Shepard | B60D 1/245 |
| 2017/0073004 A1* | 3/2017 | Shepard | B62D 15/028 |
| 2017/0294130 A1* | 10/2017 | Donnelly | G08G 1/202 |
| 2018/0097884 A1* | 4/2018 | Terwilliger | H04L 67/12 |
| 2018/0128749 A1* | 5/2018 | Goodman | F24F 11/38 |

* cited by examiner

HITCH ASSIST SYSTEM FEATURING TRAILER LOCATION IDENTIFICATION

FIELD OF THE INVENTION

The present invention generally relates to systems for hitching a vehicle to a trailer, and more particularly, to hitch assist systems capable of identifying a trailer location through image processing.

BACKGROUND OF THE INVENTION

Reversing a vehicle toward a trailer in order to attach a tow hitch to a hitch coupler can be challenging for many drivers, particularly those who are unfamiliar with trailers and the hitching process in general. Some hitch assist systems employ conventional image processing methods to determine a trailer location prior to reversing the vehicle toward the trailer. However, these conventional imaging processing methods are often complex in nature and require a significant amount of computational resources. Accordingly, there is a need for a system that is capable of identifying the trailer location in a simple manner that is less demanding from a computational aspect. The present disclosure is intended to satisfy this need.

SUMMARY OF THE INVENTION

According to a first aspect of the present invention, a hitch assist system is provided. The system includes an imager for capturing images of a rear-vehicle scene containing a trailer and a controller for processing the captured images. A device is disposed at a trailer location and has a display configured to flash a shape at a predetermined frequency and alternating in color. The controller identifies the shape in the captured images to determine the trailer location.

Embodiments of the first aspect can include any one or a combination of the following features:
 the trailer location includes a trailer tongue;
 the shape includes a circular shape;
 the shape alternates between a first color and a second color;
 the first color includes green and the second color includes red;
 the controller applies a Hough circle transform to detect one or more circular shape candidates in the captured images;
 the controller selects only the one or more circular shape candidates having one of the first color and the second color;
 the controller applies a temporal Fourier transform to determine frequencies of the one or more circular shape candidates having one of the first color and the second color;
 the controller identifies, as the shape, whichever of the one or more circular shape candidates has a frequency that best matches the predetermined frequency;
 if the controller is unable to identify the shape, the controller generates at least one of an alert and troubleshooting instruction; and
 a vehicle display for showing the shape identified in the captured images and a user-input device for enabling a user to confirm the identification of the shape.

According to a second aspect of the present invention, a hitch assist system is provided. The system includes an imager for capturing images of a rear-vehicle scene containing a trailer and a controller for processing the captured images. A device is disposed at a trailer location proximate a hitch coupler and has a display configured to flash a circular shape at a predetermined frequency and alternating between a first and second color. The controller identifies the circular shape in the captured images to determine the trailer location.

Embodiments of the second aspect can include any one or a combination of the following features:
 the trailer location includes a trailer tongue and the first color and second color include red and green, respectively;
 the controller applies a Hough circle transform to detect one or more circular shape candidates in the captured images;
 the controller selects only the one or more circular shape candidates having one of the first color and the second color;
 the controller applies a temporal Fourier transform to determine frequencies of the one or more circular shape candidates having one of the first color and the second color;
 the controller identifies, as the circular shape, whichever of the one or more circular shape candidates has a frequency that best matches the predetermined frequency;
 if the controller is unable to identify the shape, the controller generates at least one of an alert and troubleshooting instruction; and
 a vehicle display for showing the shape identified in the captured images and a user-input device for enabling a user to confirm the identification of the shape.

According to a third aspect of the present invention, a method is provided and includes the steps of: capturing images of a rear-vehicle scene containing a trailer; processing the captured images; disposing a device at a trailer location proximate a hitch coupler and having a display configured to flash a circular shape at a predetermined frequency and alternating between a first and second color; and identifying the circular shape in the captured images to determine the trailer location.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
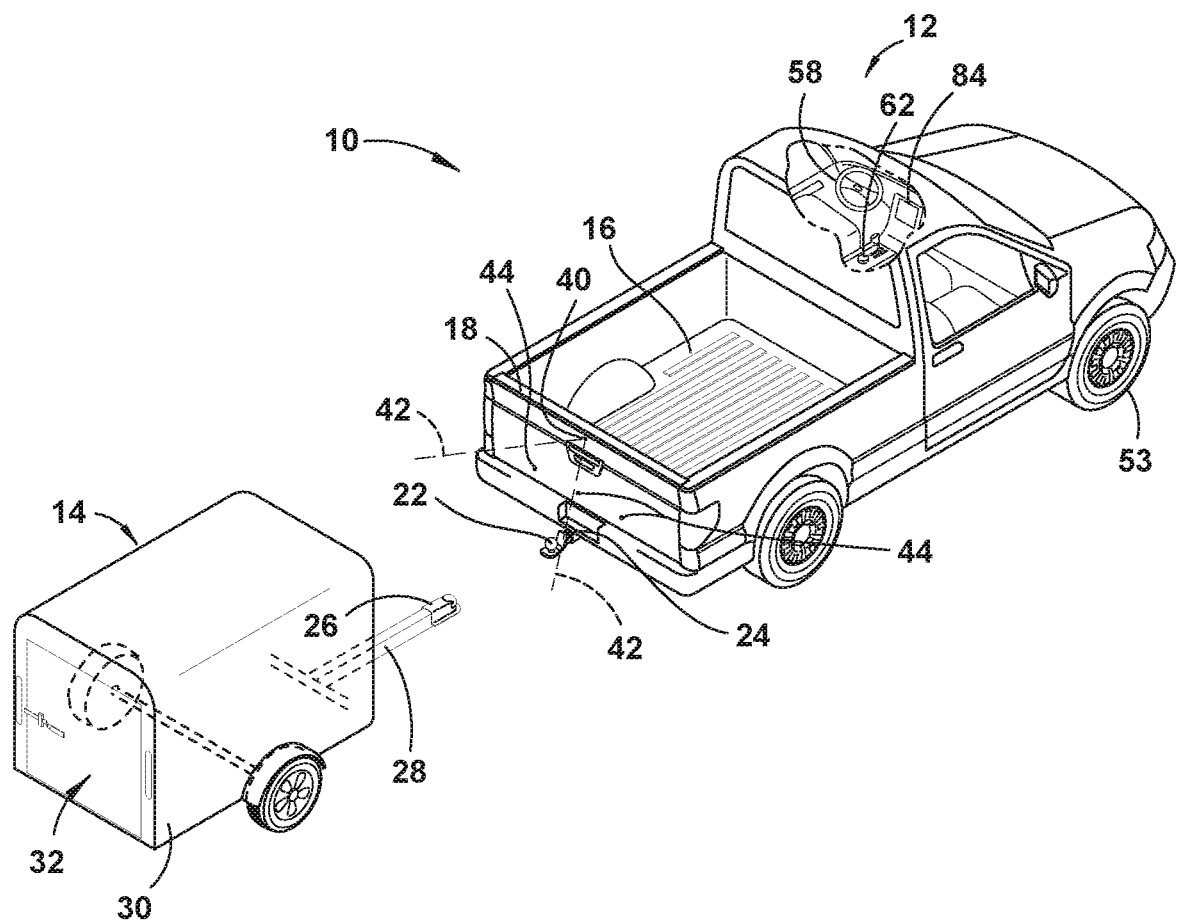
FIG. 1 is a top perspective view of a vehicle and a trailer, the vehicle being equipped with a hitch assist system according to one embodiment.
Figure 2:
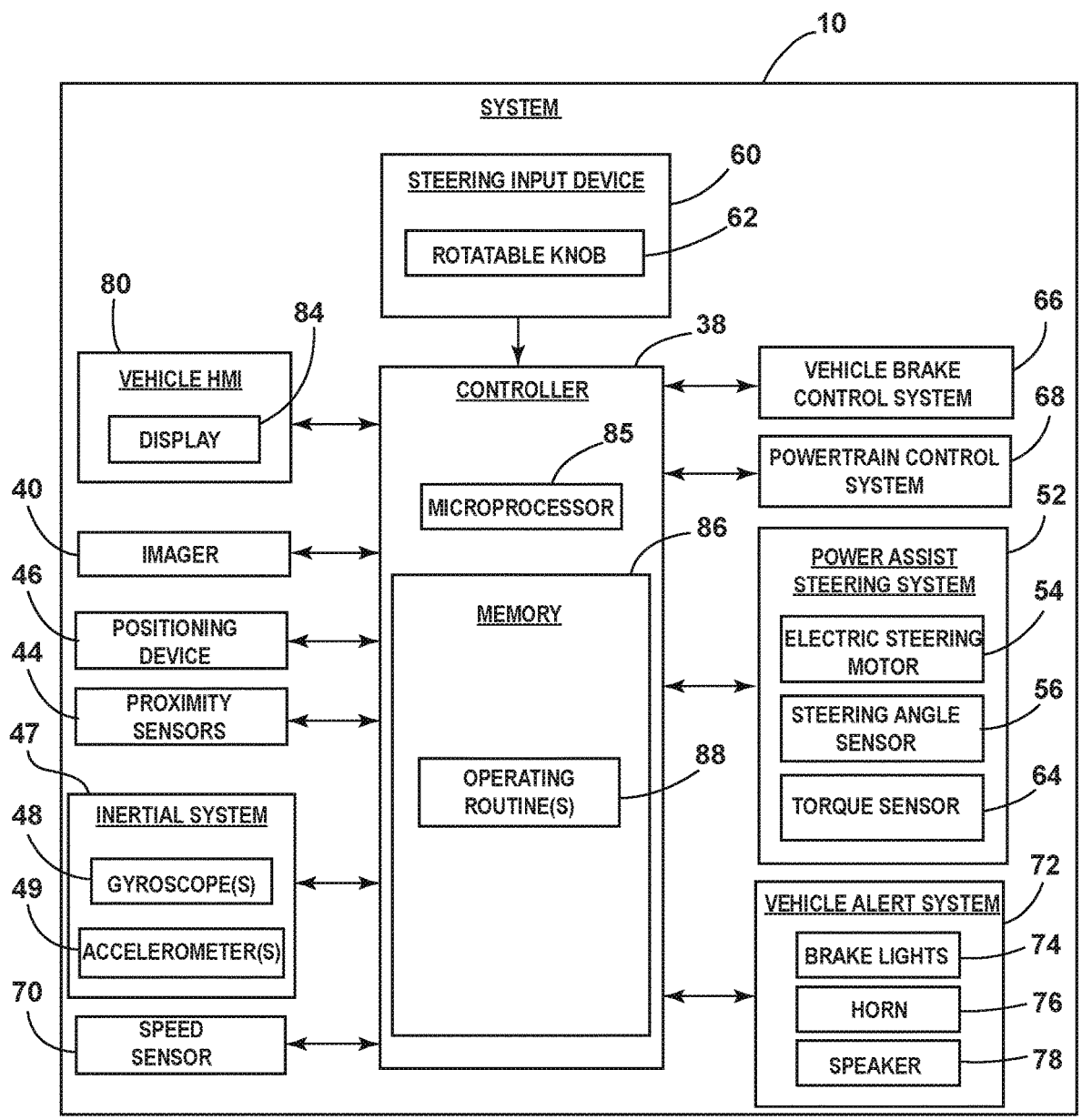
FIG. 2 is a block diagram illustrating certain components of the hitch assist system.

Referring to FIGS. 1 and 2, reference numeral 10 generally designates a hitch assist system for hitching a vehicle 12 to a trailer 14. As shown in FIG. 1, the vehicle 12 is exemplarily embodied as a pickup truck having a truck bed 16 that is accessible via a fold down tailgate 18. The vehicle 12 also includes a tow hitch in the form of a hitch ball 22 extending from a drawbar 24 that is coupled to the rear of the vehicle 12. The hitch ball 22 is configured to be received by a hitch coupler in the form of a coupler ball socket 26 that is provided at a terminal end of a trailer tongue 28. The trailer 14 is exemplarily embodied as a single axle trailer having a box frame 30 with an enclosed cargo area 32 from which the tongue 28 extends longitudinally.

The system 10 includes a controller 38 in communication with an imager 40 located at the rear of the vehicle 12. The imager 40 may be centrally located at an upper region of the tailgate 18 such that the imager 40 is elevated relative to the drawbar 24 and the hitch ball 22. The imager 40 has a field of view 42 located and oriented to capture one or more images of a rear-vehicle scene that generally includes the hitch ball 22, among other things. Images captured by the imager 40 may be processed by the controller 38 to identify a hitch coupler such as the coupler ball socket 26.

In addition to communicating with the imager 40, the controller 38 may communicate with a number of proximity sensors 44 exemplarily shown as ultrasonic sensors spaced across a lower region of the vehicle tailgate 18 and configured to detect the proximity or distance of objects located rearward of the vehicle 12. With reference to the embodiment of the system 10 shown in FIG. 2, additional vehicle-related information may be provided to the controller 38 by a positioning device 46, such as a global positioning system (GPS) located on the vehicle 12 and/or the trailer 14. Additionally, the controller 38 may communicate with an inertial system 47 including one or more gyroscopes 48 and accelerometers 49 to measure the position, orientation, direction, and/or speed of the vehicle 12.

To enable autonomous or semi-autonomous control of the vehicle 12, the controller 38 of system 10 may be further configured to communicate with a variety of vehicle equipment. According to one embodiment, the controller 38 of the system 10 may control a power assist steering system 52 of the vehicle 12 to operate the steered wheels 53 of the vehicle 12 while the vehicle 12 is reversed toward the trailer 14 along a vehicle backup path. The power assist steering system 52 may be an electric power-assisted steering (EPAS) system that includes an electric steering motor 54 for turning the steered wheels 53 to a steering angle based on a steering command generated by the controller 38, whereby the steering angle may be sensed by a steering angle sensor 56 of the power assist steering system 52 and provided to the controller 38. As described herein, the steering command may be provided for autonomously steering the vehicle 12 during a backup maneuver and may alternatively be provided manually via a rotational position (e.g., a steering wheel angle) of a steering wheel 58 or a steering input device 60, which may be provided to enable a driver to control or otherwise modify the desired curvature of the backing path of vehicle 12. The steering input device 60 may be communicatively coupled to the controller 38 in a wired or wireless manner and provides the controller 38 with information defining the desired curvature of the backing path of the vehicle 12. In response, the controller 38 processes the information and generates corresponding steering commands that are supplied to the power assist steering system 52 of the vehicle 12. In one embodiment, the steering input device 60 includes a rotatable knob 62 operable between a number of rotated positions that each provides an incremental change to the desired curvature of the backing path of the vehicle 12.

In some embodiments, the steering wheel 58 of the vehicle 12 may be mechanically coupled with the steered wheels 53 of the vehicle 12, such that the steering wheel 58 moves in concert with steered wheels 53 via an internal torque, thereby preventing manual intervention with the steering wheel 58 during autonomous steering of the vehicle 12. In such instances, the power assist steering system 52 may include a torque sensor 64 that senses torque (e.g., gripping and/or turning) on the steering wheel 58 that is not expected from autonomous control of the steering wheel 58 and therefore indicative of manual intervention by the driver. In some embodiments, external torque applied to the steering wheel 58 may serve as a signal to the controller 38 that the driver has taken manual control and for the system 10 to discontinue autonomous steering functionality.

The controller 38 of the system 10 may also communicate with a vehicle brake control system 66 of the vehicle 12 to receive vehicle speed information such as individual wheel speeds of the vehicle 12. Additionally or alternatively, vehicle speed information may be provided to the controller 38 by a powertrain control system 68 and/or a vehicle speed sensor 70, among other conceivable means. In some embodiments, the controller 38 may provide braking commands to the vehicle brake control system 66, thereby allowing the system 10 to regulate the speed of the vehicle 12 during a backup maneuver of the vehicle 12. It should be appreciated that the controller 38 may additionally or alternatively regulate the speed of the vehicle 12 via interaction with the powertrain control system 68.

Through interaction with the power assist steering system 52, the vehicle brake control system 66, and/or the powertrain control system 68 of the vehicle 12, the potential for unacceptable backup conditions can be reduced when the vehicle 12 is backing toward the trailer 14. Examples of unacceptable backup conditions include, but are not limited to, a vehicle over-speed condition, sensor failure, and the like. In such circumstances, the driver may be unaware of the failure until the unacceptable backup condition is imminent or already happening. Therefore, it is disclosed herein that the controller 38 of the system 10 can generate an alert signal corresponding to a notification of an actual, impending, and/or anticipated unacceptable backup condition, and prior to driver intervention, generate a counter measure to prevent such an unacceptable backup condition.

According to one embodiment, the controller 38 may communicate with one or more devices, including a vehicle alert system 72, which may prompt visual, auditory, and tactile warnings. For instance, vehicle brake lights 74 and vehicle emergency flashers may provide a visual alert and a vehicle horn 76 and/or speaker 78 may provide an audible alert. Additionally, the controller 38 and/or vehicle alert system 72 may communicate with a human machine interface (HMI) 80 of the vehicle 12. The HMI 80 may include a touchscreen display 84 such as a center-stack mounted navigation or entertainment display capable of displaying images indicating the alert. Such an embodiment may be desirable to notify the driver of the vehicle 12 that an unacceptable backup condition is present.

The controller 38 is configured with a microprocessor 85 and/or other analog and/or digital circuitry for processing one or more logic routines stored in a memory 86. The logic routines may include one or more operating routines 88. Information from the imager 40 or other components of the system 10 can be supplied to the controller 38 via a communication network of the vehicle 12, which can include a controller area network (CAN), a local interconnect network (LIN), or other conventional protocols used in the automotive industry. It should be appreciated that the controller 38 may be a stand-alone dedicated controller or may be a shared controller integrated with the imager 40 or other component of the system 10 in addition to any other conceivable onboard or off-board vehicle control systems.

Figure 3:
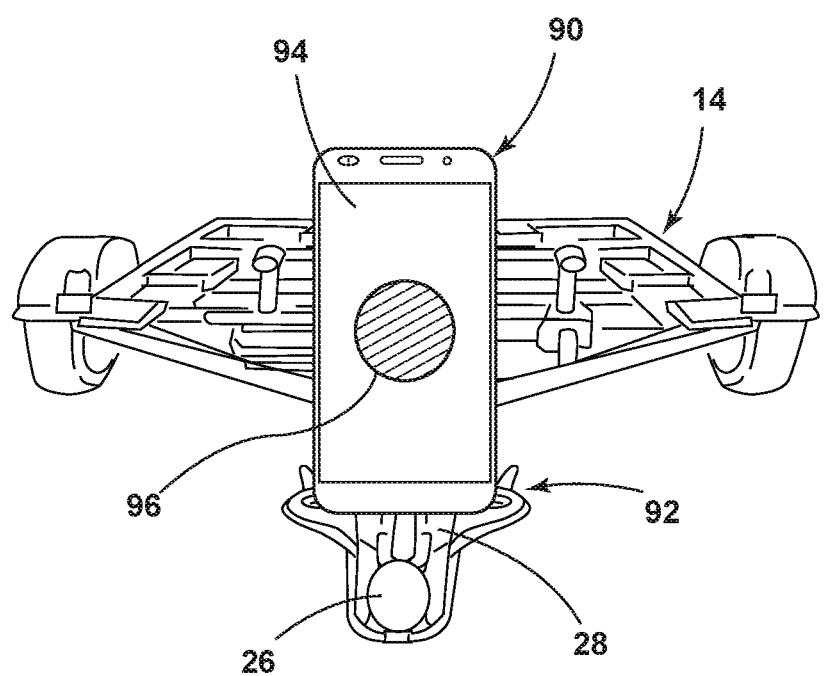
FIG. 3 illustrates a device at a trailer location and having a display configured to flash a pattern.

Referring to FIG. 3, the system 10 includes a device 90 disposed at a trailer location 92 and having a display 94 configured to flash a shape 96 at a predetermined frequency and alternating in color. In the depicted embodiment, the device 90 is a portable electronic device such as a smartphone, tablet or the like. The trailer location 92 includes the tongue 28 and portions thereof proximate the hitch coupler (e.g., coupler ball socket 26). The device 90 may be secured to the tongue 28 via a device holder, rested on the tongue 28 using a device stand, or held near the trailer location 92 by hand, for example. The shape 96 is exemplarily shown as a circular shape centrally located on the display 94 of the device 90. The size of the shape 96 is generally predetermined and the flashing of the same may be executed by a software application stored on the device 90.

Figure 4:
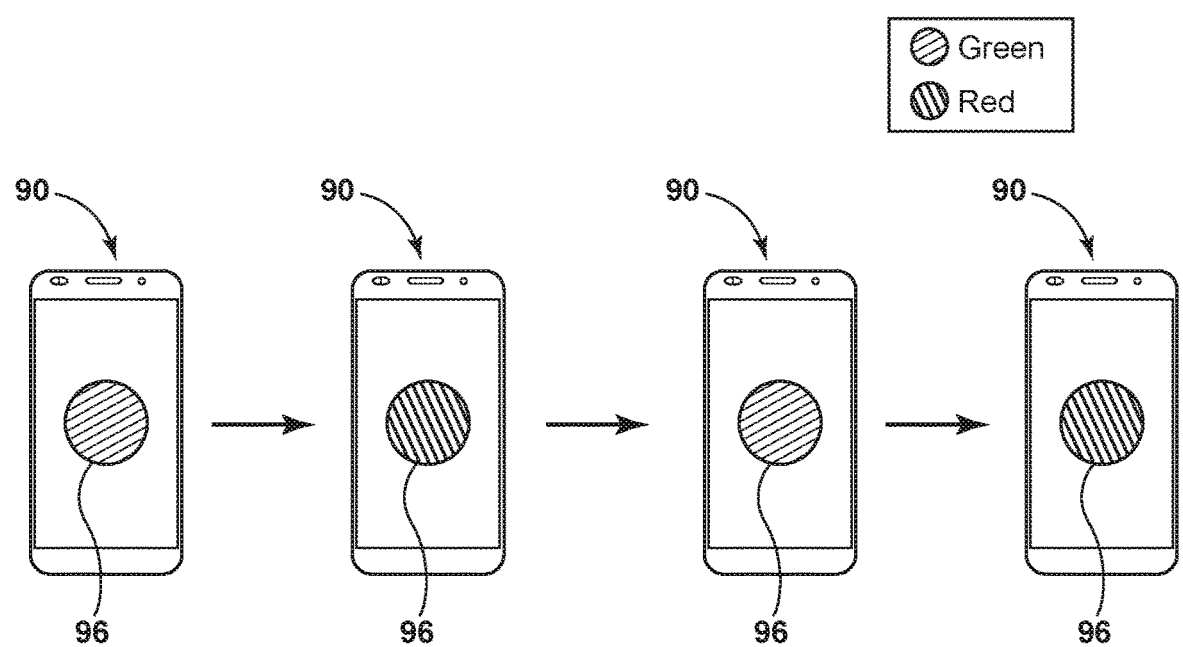
FIG. 4 illustrates a flashing sequence displayed on the device shown in FIG. 3.

Referring to FIG. 4, an exemplary flashing pattern is shown. As depicted, the device 90 flashes the shape 96 at the predetermined frequency such that the shape 96 alternates between a first color and a second color. For example, the predetermined frequency may correspond to 10 Hertz and the first and second color may be green and red, respectively. In the depicted embodiment, one period corresponds to the shape 96 alternating once between the first and second color. While the shape 96 is generally displayed at the same location for each color, it is contemplated that the shape 96 may move such that it is displayed in different locations for each respective color, if desired. Accordingly, while the shape 96 is two-dimensional in nature, the adoption of color alternation along with flashing the shape 96 in temporal fashion imparts a four-dimensional aspect to the shape 96 and enables the same to be easily identified using image processing means.

In operation, the controller 38 identifies the shape 96 in images captured by the imager 40 to determine the trailer location 92. For example, the controller 38 may be programmed to detect the flashing pattern described with reference to FIG. 4. The flashing pattern may be stored to the memory 86 of the controller 38 and the detection means may be provided in the one or more operating routines 88 of the controller 38.

Figure 5:
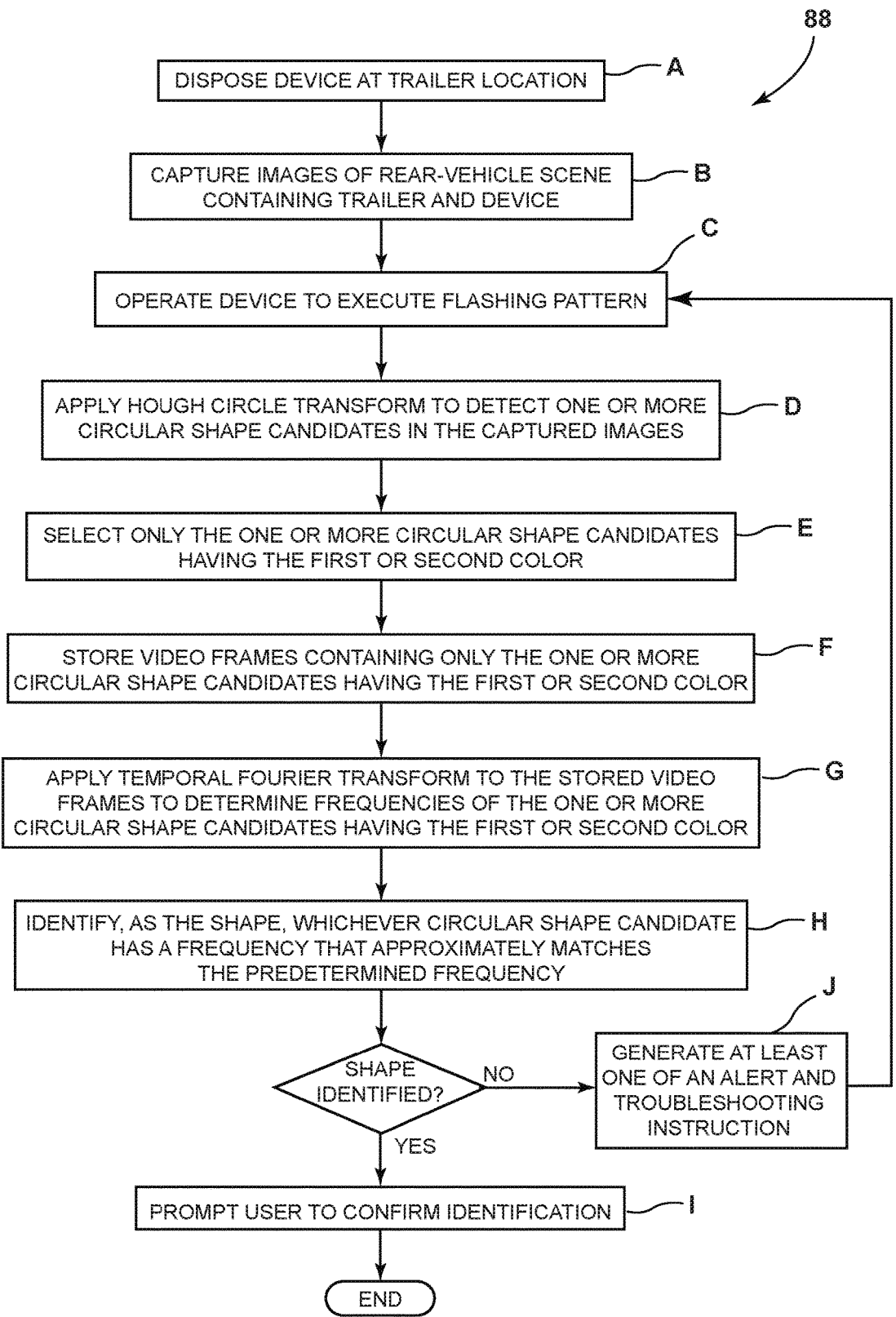
FIG. 5 is a flow chart of a method for determining the trailer location.

For purposes of illustration, a method of determining a trailer location is shown in FIG. 5 and is exemplarily embodied as the one or more operating routines 88 of the controller 38. The detection method is exemplarily described with reference to the flashing pattern of FIG. 4. At step A, the device 90 is disposed at the trailer location 92. As described herein, the trailer location 92 may include the tongue 28 and portions thereof proximate the hitch coupler. At step B, images are captured of a rear-vehicle scene containing the trailer 14 and the device 90 at the trailer location 92. To do so, a user may be required to position the vehicle 12 such that the trailer 14 and the device 90 are within the field of view 42 of the imager 40. At step C, the device 90 is operated to execute the flashing pattern, that is, to flash the shape 96 at the predetermined frequency such that the shape 96 alternates between the first color and the second color as described herein. The captured images containing the device 90 are provided to the controller 38 for image processing.

At step D, the controller 38 applies a Hough circle transform to detect one or more circular shape candidates in the captured images. For example, the Hough circle transform may be applied to each video frame and the circular shape candidates include the shape 96 and may also include other objects in the captured images having a circular shape. At step E, the controller 38 selects only the one or more circular shape candidates having one of the first color and the second color. For example, the controller 38 may filter the video frames from step D to isolate only the one or more circular shape candidates having a green or red color. At step F, a number of the video frames are stored (e.g., to memory 86) containing only the one or more circular candidates having the first or second color. For example, the number of video frames may have a duration of 3-5 seconds to ensure that the video frames contain one or more periods of the flashing pattern.

At step G, the controller 38 applies a temporal Fourier transform to the stored video frames to determine frequencies of the one or more circular shape candidates having one of the first color and the second color. At step H, the controller 38 identifies, as the shape 96, whichever of the one or more circular shape candidates has a frequency that approximately matches the predetermined frequency (e.g., 10 Hz). If the controller 38 identifies the shape 96 at step H, the user may be prompted to confirm the identification of the shape 96 at step I. For example, the identified shape may be displayed on the touchscreen display 84 of the vehicle 12 and the user may confirm its identity by touching an assigned area of the display 84 or through other user-input means. Conversely, if the controller 38 is unable to identify the shape 96 at step H, the controller 38 may generate at least one of an alert and troubleshooting instruction at step J. For example, the controller 38 may enlist the vehicle alert system 72 to instruct the user to position the vehicle 12 closer to the trailer 14 and repeat steps C-H so that the shape 96 may be identified. Having successfully identified the shape 96, the system 10 may then reverse the vehicle 12 toward the trailer location 92. As described herein, the reversing of the vehicle 12 may occur autonomously or semi-autonomously.

Accordingly, a hitch assist system is provided herein. The system advantageously determines a trailer location by identifying a shape in captured images. The shape appears in a flashing pattern displayed on a device located at the trailer location. This form of identification is simple to implement and generally less demanding than other forms of trailer identification employing the use of an imager.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A hitch assist system comprising:
   an imager for capturing images of a rear-vehicle scene containing a trailer;
   a controller for processing the captured images;
   a device disposed at a trailer location and having a display configured to flash a shape at a predetermined frequency and alternating in color, wherein the imager captures images of the display of the device in the rear-vehicle scene and the controller identifies the shape flashing on the display in the captured images to determine the trailer location.

2. The hitch assist system of claim 1, wherein the trailer location comprises a trailer tongue.

3. The hitch assist system of claim 1, wherein the shape comprises a circular shape.

4. The hitch assist system of claim 3, wherein the shape alternates between a first color and a second color.

5. The hitch assist system of claim 4, wherein the first color comprises green and the second color comprises red.

6. The hitch assist system of claim 4, wherein the controller applies a Hough circle transform to detect one or more circular shape candidates in the captured images.

7. The hitch assist system of claim 6, wherein the controller selects only the one or more circular shape candidates having one of the first color and the second color.

8. The hitch assist system of claim 7, wherein the controller applies a temporal Fourier transform to determine frequencies of the one or more circular shape candidates having one of the first color and the second color.

9. The hitch assist system of claim 8, wherein the controller identifies, as the shape, whichever of the one or more circular shape candidates has a frequency that best matches the predetermined frequency.

10. The hitch assist system of claim 1, wherein if the controller is unable to identify the shape, the controller generates at least one of an alert and troubleshooting instruction.

11. The hitch assist system of claim 1, further comprising a vehicle display for showing the shape identified in the captured images and a user-input device for enabling a user to confirm the identification of the shape.

12. A hitch assist system comprising:
    an imager for capturing images of a rear-vehicle scene containing a trailer;
    a controller for processing the captured images; and
    a device disposed at a trailer location proximate a hitch coupler and having a display configured to flash a circular shape at a predetermined frequency and alternating between a first and second color, wherein the imager captures images of the display of the device in the rear-vehicle scene and the controller identifies the circular shape flashing on the display in the captured images to determine the trailer location.

13. The hitch assist system of claim 12, wherein the trailer location comprises a trailer tongue and the first color and second color comprise red and green, respectively.

14. The hitch assist system of claim 12, wherein the controller applies a Hough circle transform to detect one or more circular shape candidates in the captured images.

15. The hitch assist system of claim 14, wherein the controller selects only the one or more circular shape candidates having one of the first color and the second color.

16. The hitch assist system of claim 15, wherein the controller applies a temporal Fourier transform to determine frequencies of the one or more circular shape candidates having one of the first color and the second color.

17. The hitch assist system of claim 16, wherein the controller identifies, as the circular shape, whichever of the one or more circular shape candidates has a frequency that best matches the predetermined frequency.

18. The hitch assist system of claim 12, wherein if the controller is unable to identify the shape, the controller generates at least one of an alert and troubleshooting instruction.

19. The hitch assist system of claim 12, further comprising a vehicle display for showing the shape identified in the captured images and a user-input device for enabling a user to confirm the identification of the shape.

20. A method comprising the steps of:
    disposing a device at a trailer location proximate a hitch coupler of a trailer not attached to a vehicle and having a display configured to flash a circular shape at a predetermined frequency and alternating between a first and second color;
    capturing images of a rear vehicle scene containing the trailer and the device disposed at the trailer location;
    processing the captured images; and
    identifying the circular shape flashing on the display in the captured images to determine the trailer location.

* * * * *